United States Patent
Nelson et al.

(10) Patent No.: US 7,118,165 B2
(45) Date of Patent: Oct. 10, 2006

(54) FLEXIBLE AND STIFF WALL EXTENSION FOR AN OPEN LOAD HAULING BOX ON A TRUCK

(76) Inventors: Darwin D. Nelson, 108 S. Goff St., Euds, CO (US) 81036; Leland D. Nelson, 17999 County Rd. #30, Euds, CO (US) 81036

( * ) Notice: Subject to any disclaimer, the term of this patent is extended or adjusted under 35 U.S.C. 154(b) by 397 days.

(21) Appl. No.: 10/640,947

(22) Filed: Aug. 15, 2003

(65) Prior Publication Data

US 2005/0269835 A1   Dec. 8, 2005

(51) Int. Cl.
*B62D 33/02* (2006.01)
*B62D 33/10* (2006.01)

(52) U.S. Cl. ............... 296/186.2; 296/183.1; 296/26.04; 296/26.06; 296/26.07

(58) Field of Classification Search .. 296/26.04–26.07, 296/37.6, 182.1, 186.2, 183.1, 165
See application file for complete search history.

(56) References Cited

U.S. PATENT DOCUMENTS

| | | | | |
|---|---|---|---|---|
| 4,448,453 A | * | 5/1984 | Irelan et al. | 296/156 |
| 4,544,196 A | * | 10/1985 | Schmeichel et al. | 296/26.07 |
| 4,603,901 A | * | 8/1986 | McIntosh et al. | 296/165 |
| 5,364,154 A | * | 11/1994 | Kaiser | 296/100.07 |
| 5,366,266 A | * | 11/1994 | Harbison | 296/100.02 |
| 6,126,220 A | * | 10/2000 | Brasher | 296/26.04 |
| 6,152,517 A | * | 11/2000 | Steadman | 296/107.01 |
| 6,196,604 B1 | * | 3/2001 | Hoh et al. | 296/26.05 |
| 6,209,944 B1 | * | 4/2001 | Billiu et al. | 296/100.02 |
| 6,227,592 B1 | * | 5/2001 | Thacker | 296/26.07 |
| 6,325,447 B1 | * | 12/2001 | Kuo | 296/165 |
| 6,332,637 B1 | * | 12/2001 | Chambers | 296/3 |
| 6,565,143 B1 | * | 5/2003 | Okamoto | 296/165 |
| 6,634,689 B1 | * | 10/2003 | Soto | 296/3 |
| 6,666,490 B1 | * | 12/2003 | Thacker | 296/26.07 |
| 6,712,421 B1 | * | 3/2004 | Wilson | 296/165 |

* cited by examiner

*Primary Examiner*—D. Glenn Dayoan
*Assistant Examiner*—Greg Blankenship
(74) *Attorney, Agent, or Firm*—G F Gallinger

(57) ABSTRACT

A collapsible upright wall extends the height of the sides on the load hauling box on a truck. The collapsible upright wall comprises a fabric which when vertically stretched provides adequate resistance to substantial lateral load. A method of increasing the volumetric capacity of the box on a truck comprises the steps of: a) providing a rectangular frame above, and dimensioned to seat adjacent to an open top side portion of the load hauling box on the truck; b) providing a substantial lift mechanism to uniformly lift the rectangular frame above the box; and, c) providing and attaching an elongate strip of fabric having a top elongate side portion peripherally attached to the rectangular frame, and a bottom elongate side portion peripherally attached to the open top side portion of the box. Then when the rectangular frame is lifted to an upper operable position the fabric is stretched taut and is thereby able to sustain significant lateral load.

7 Claims, 2 Drawing Sheets

FLEXIBLE AND STIFF WALL EXTENSION FOR AN OPEN LOAD HAULING BOX ON A TRUCK

FIELD OF THE INVENTION

This invention relates to increasing the volumetric hauling capacity of a truck. More particularly this invention relates to a collapsible upright wall which extends the height of the sides on the box of a truck. The collapsible upright wall comprises a fabric which when vertically stretched provides adequate resistance to substantial lateral load.

BACKGROUND OF THE INVENTION

The inventors are in the business of hauling grain and seeds with tractors and trailers. Recently they have been hauling sunflower seeds. Sunflower seeds have a high bulk to weight ratio. When a trailer is fully loaded with sunflower seeds it is carrying less than 70% of its licensed load weight. To substantially increase profitability the inventors have experimented with different methods of increasing the volumetric capacity of their trailers.

One method of increasing the capacity is to attach a peripheral fabric extension to the top portion of the walls of the trailer. A collapsible peripheral extension can be raised when hauling load and lowered to reduce drag and conserve fuel when driving unloaded. The problem with this solution is that the fabric extension lacks sufficient strength to support lateral load produced by the shifting cargo. Sustained vibration and rapid deceleration both result in large lateral loads on the fabric extension.

The inventor has found that only when the fabric is maintained taut that it is able to sustain significant lateral loading. Within this specification fabric is broadly defined to include any plastic or other material which is capable of centrally flexing.

OBJECTS OF THE INVENTION

It is an object of this invention to disclose a method of temporarily increasing the volumetric hauling capacity of a truck in order to haul a bulky load. It is an object of this invention to disclose a fabric wall extension to extend the height of the sides of a truck. It is an object of this invention to disclose a method of utilizing a lightweight and readily collapsible fabric extension which results in the fabric having adequate strength to sustain significant lateral loading. It is yet a further object of this invention to disclose a method of uniformly lifting a rectangular frame above a trailer so that the fabric connected thereto is taut around the entire peripheral top portion of the trailer. It is yet a further object of this invention to disclose a method of uniformly lifting the frame from a single point of lifting. It is a final object of this invention to provide a taut wall extension for a pick up truck.

One aspect of this invention provides for a method of increasing the volumetric capacity of an open load hauling box on a truck comprising the steps of: a) providing a rectangular frame above, and dimensioned to seat adjacent to an open top side portion of the load hauling box on the truck; b) providing a substantial lift mechanism to uniformly lift the rectangular frame above the box; and, c) providing and attaching an elongate strip of fabric having a top elongate side portion peripherally attached to the rectangular frame, and a bottom elongate side portion peripherally attached to the open top side portion of the box. Then when the rectangular frame is lifted to an upper operable position the fabric is stretched taut and is thereby able to sustain significant lateral load.

In an aspect of the above apparatus preferred for a pick up truck the lift mechanism comprises a shaft having a worm gear thereon, and a pinion having an arm attached thereto so that when the shaft is rotated the arm becomes more upright and lifts the rectangular frame.

Various other objects, advantages and features of this invention will become apparent to those skilled in the art from the following description in conjunction with the accompanying drawings.

FIGURES OF THE INVENTION

Figure 1:
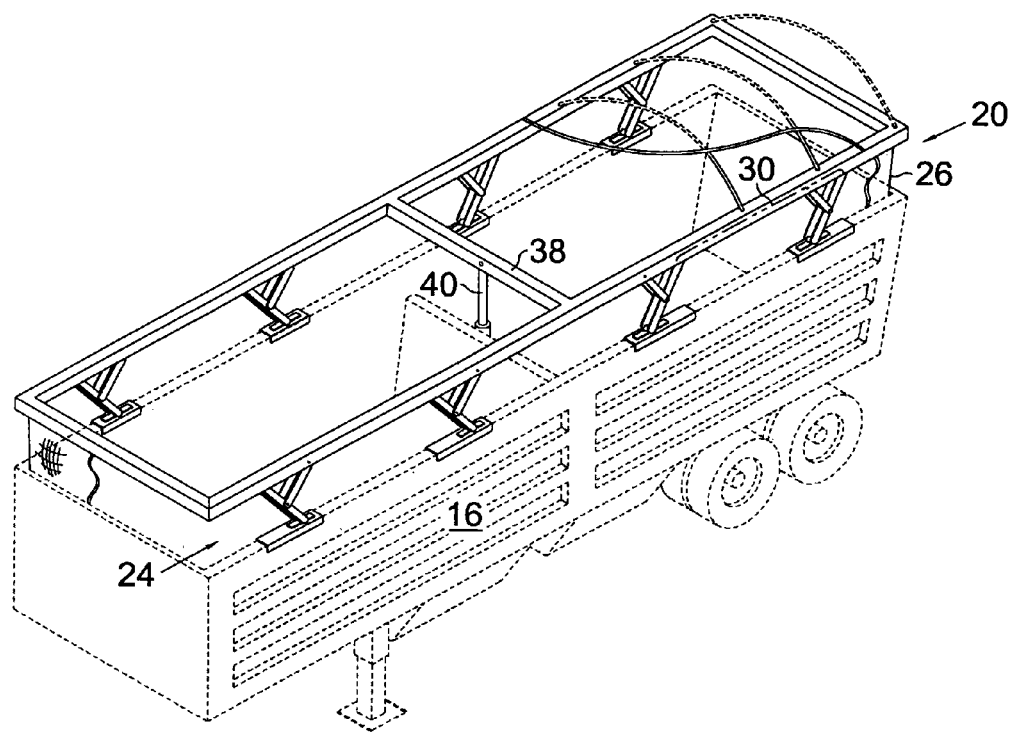
FIG. 1 is a perspective view of a truck trailer having a flexible and stiff wall extension mounted on a top portion of the trailer. A near portion of the fabric is broken away to show the lifting mechanism.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a truck trailer 18 having a flexible and stiff wall extension 20 mounted on a top portion of the trailer 18. In FIG. 1 a near portion of fabric 26 in the wall extension 20 is broken away to show a lifting mechanism 24. The wall extension is flexible when it is a lowered nonoperable position but it is stiff when it is in a taut upper operable position as shown in FIG. 1. A method of increasing the volumetric capacity of an open load hauling box 16 on a truck 14 comprises the steps of: a) providing a rectangular frame 22 above, and dimensioned to seat adjacent to an open top side portion of the load hauling box 16 on the truck 14; b) providing a substantial lift mechanism 24 to uniformly lift the rectangular frame 22 above the box 16; and, c) providing and attaching an elongate strip of fabric 26 having a top elongate side portion peripherally attached to the rectangular frame 22, and a bottom elongate side portion peripherally attached to the open top side portion of the box 16. When the rectangular frame 22 is lifted to an upper operable position the fabric is stretched taut. The taut and rigid fabric is thereby able to sustain significant lateral load.

Figure 2:
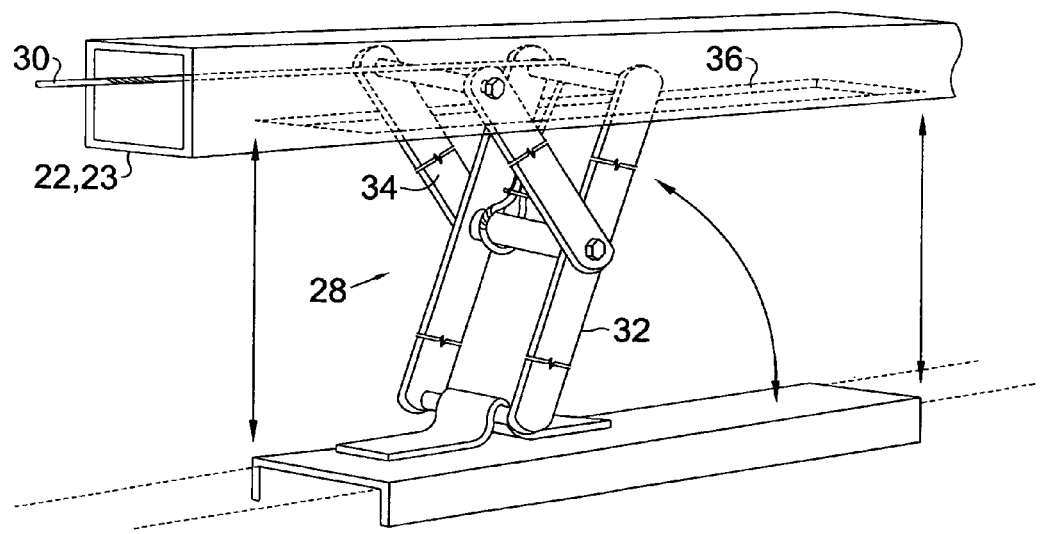
FIG. 2 is an enlarged perspective view of a rear lifting bracket which is shown in FIG. 1.

FIG. 2 is an enlarged perspective view of a rear lifting link 28 which is shown on the right side of FIG. 1. In a preferred aspect of the invention which is particularly well suited to a truck trailer 18 the lift mechanism 24 comprises hinged links 28. Said links 28 have one end portion hinged to either the frame 22 or the top side portion of the truck box 16. Each link 28 has an opposite end portion slidingly disposed within a track 30 on the other of the frame 22 or the top side portion of the truck box 16. When the slidingly disposed end portion of the link 28 is drawn to an upright position the frame 22 is lifted. In a more preferred embodiment of the invention an upper end portion of the link 28 is slidingly disposed and a lower end portion of the link 28 is hinged.

In the most preferred embodiment of the invention a longer side portion of the rectangular frame 22 is centrally lifted and there are four spaced links 28 along each opposite longer side portion of the rectangular frame 22. The upper slidingly disposed end portions of the front and rear inner links 28 are respectively connected together, then when the upper portions of the two inner links 28 move a specified distance raising a central portion of the frame 22 a specific height, the upper portions of the two outer links 28 move similar distances raising an outer portion of the frame 22 a corresponding height.

In the most preferred embodiment of the invention the connection between the two front links 28 and the two rear links 28 comprises a cable 30. If each link 28 comprises two paired similar, spaced side portions 32, then lateral stability to the rectangular frame 22 is ensured. If each link 28 further comprises longer link portion 32 and a auxiliary paired shorter link portion 34 having a lower end portion pivoted to a central portion of the longer link portion 32, and said shorter link 34 has an upper end portion hinged to the rectangular frame 22 then together the longer link portion 32 and shorter link 34 portions have a Y configuration.

The inventors have found that when the rectangular frame 22 may advantageously be constructed from 3" square tubing 23. Said track 22 may then be constructed by making a rectangular opening 36 in a bottom side portion of the rectangular tubing 23 so that the paired link 28 may be positioned and slide within the rectangular opening 36. Looking again at FIG. 1, a central member 38 extends between central portions of the rectangular frame's 22 two opposite longer sides and a single piston 40 is then able to lift a central portion of this central member 38 so that the entire frame 22 is thereby uniformly lifted therewith.

Figure 3:
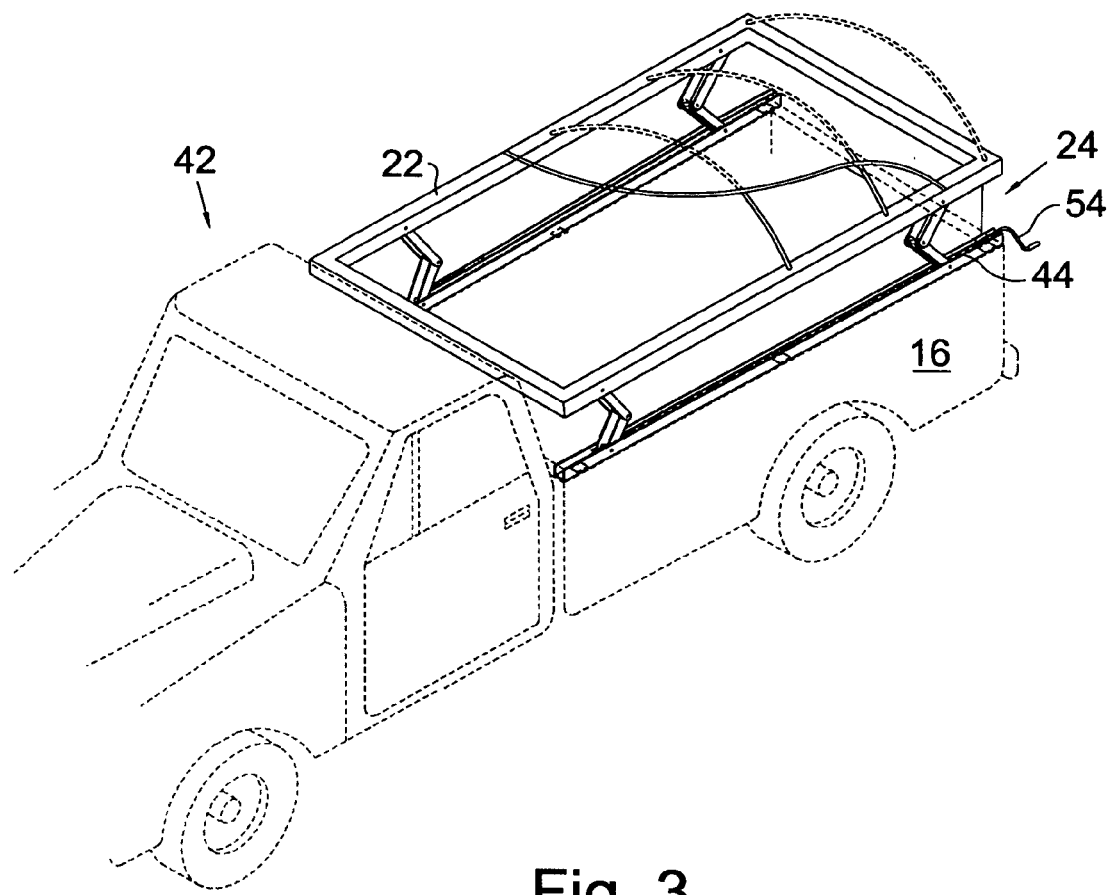
FIG. 3 is a perspective view of a load hauling box on a pickup truck having a rectangular frame mounted thereon, a lift mechanism, and a fabric extending between the truck box and the rectangular frame.
Figure 4:
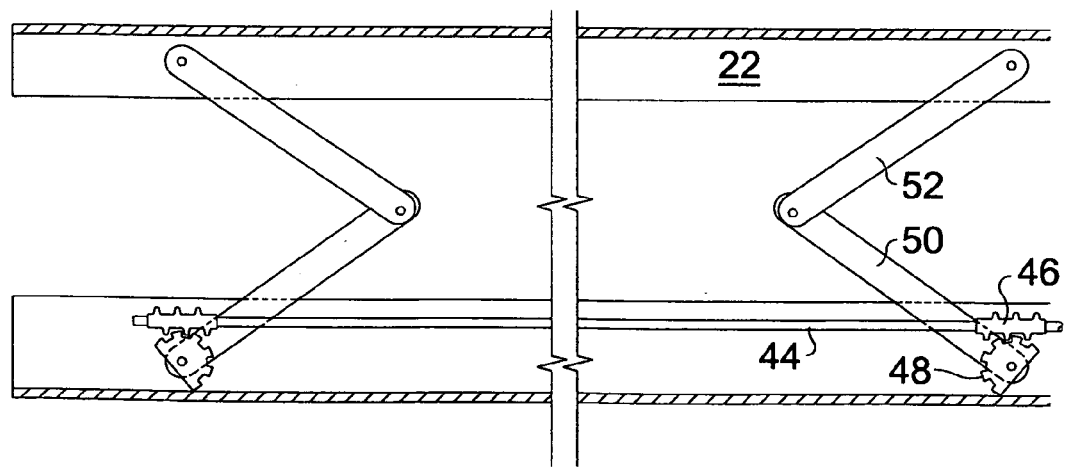
FIG. 4 is a partial elevational view showing the lift mechanism shown in FIG. 3.

FIG. 3 is a perspective view of a load hauling box 16 on a pickup truck 42 having a rectangular frame 22 mounted thereon, a lift mechanism 24, and a fabric 26 extending between the truck box 16 and the rectangular frame 22. FIG. 4 is a partial elevational view which better shows the lift mechanism 24 shown in FIG. 3. The lift mechanism 24 comprises a shaft 44 having a worm gear 46 thereon. A pinion 48 has an arm 50 attached thereto so that when the shaft 44 is rotated the arm 50 becomes more upright and lifts the rectangular frame 22.

In a preferred embodiment of the pickup truck mechanism 24 a lower portion of the arm 50 is attached to the pinion 48 and a top portion of the arm 50 is hinged to a forearm 52 having an upper portion hinged to the rectangular frame 22 so that when the shaft 44 is turned both the arm 50 and forearm 52 become more upright and the frame is vertically lifted.

In the most preferred embodiment of the pickup truck mechanism 24 the shaft 44 extends along a length of the rectangular box 16 and the shaft 44 is driven by a crank 54 on a rear end portion of the shaft 44.

While the invention has been described with preferred specific embodiments thereof, it will be understood that this description is intended to illustrate and not to limit the scope of the invention, which is defined by the following claims.

We claim:

1. A method of increasing the volumetric capacity of an open load hauling box on a truck comprising the steps of:
   a) providing a rectangular frame above, and dimensioned to seat adjacent to an open top side portion of the load hauling box on the truck;
   b) providing a lift mechanism wherein the lift mechanism comprises hinged links, said links having one end portion hinged to one of the frame and the top side portion of the truck box, and each link having an opposite end portion slidingly disposed within a track on the other of the frame and the top side portion of the truck box, so that when the slidingly disposed end portion of the link is drawn to an upright position the frame is lifted to uniformly lift the rectangular frame above the box;
   c) wherein a longer side portion of the rectangular frame is centrally lifted and there are four spaced links along each opposite longer side portion of the rectangular frame, and the slidingly disposed end portions of the front and rear inner links are respectively connected together, so that when the slidingly disposed portions of the two inner links move a specified distance raising a central portion of the frame a specific height, the slidingly disposed portions of the two outer links move similar distances raising an outer portion of the frame a corresponding height; and,
   d) providing and attaching an elongate strip of fabric having a top elongate side portion peripherally attached to the rectangular frame, and a bottom elongate side portion peripherally attached to the open top side portion of the box;
   so that when the rectangular frame is uniformly lifted therearound to an upper operable position, the fabric is uniformly stretched taut therearound and is thereby able to sustain significant lateral load.

2. A method as in claim 1 wherein an upper end portion of each link is slidingly disposed and a lower end portion of each link is hinged.

3. A method as in claim 1 wherein the connection between the two front links and the two rear links comprises a cable.

4. A method as in claim 3 further wherein each link further comprises two paired similar, spaced side portions to thereby provide lateral stability to the rectangular frame.

5. A method as in claim 4 wherein each link further comprises a long link portion and an auxiliary paired shorter link portion having a lower end portion pivoted to a central portion of a longer link portion, and wherein said shorter link portion has an upper end portion pivoted to the rectangular frame, then together the longer and shorter link portions have a Y configuration.

6. A method as in claim 5 wherein the rectangular frame comprises square tubing and wherein said track is constructed by making a rectangular opening in a bottom side portion of the rectangular tubing so that the paired link may be positioned and slide within the rectangular opening in the bottom side portion of the tubing.

7. A method as in claim 6 wherein the rectangular frame further comprises a central member extending between central portions of the rectangular frame's two opposite longer sides and wherein a single piston is used to lift a central portion of this central member.

* * * * *